(12) United States Patent
Schmidt-Winkel et al.

(10) Patent No.: US 12,110,928 B2
(45) Date of Patent: Oct. 8, 2024

(54) DOG CLUTCH ASSEMBLY, POWERTRAIN, AND MOTOR VEHICLE

(71) Applicant: ZF FRIEDRICHSHAFEN AG, Friedrichshafen (DE)

(72) Inventors: Norman Schmidt-Winkel, Kürnach (DE); Martin Ruider, Schwarzhofen (DE); Fabian Hartmann, Hettstadt (DE); Ludwig Geißelbrecht, Sachsen b. Ansbach (DE); Bastian Schuh, Friedrichshafen (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 0 days.

(21) Appl. No.: 18/272,904

(22) PCT Filed: Jan. 18, 2022

(86) PCT No.: PCT/EP2022/051000
§ 371 (c)(1),
(2) Date: Jul. 18, 2023

(87) PCT Pub. No.: WO2022/157142
PCT Pub. Date: Jul. 28, 2022

(65) Prior Publication Data
US 2024/0102515 A1 Mar. 28, 2024

(30) Foreign Application Priority Data
Jan. 21, 2021 (DE) .................... 10 2021 200 503.9

(51) Int. Cl.
*F16D 11/14* (2006.01)
*F16D 11/00* (2006.01)
*F16D 11/10* (2006.01)

(52) U.S. Cl.
CPC ........ *F16D 11/14* (2013.01); *F16D 2011/002* (2013.01); *F16D 2011/004* (2013.01);
(Continued)

(58) Field of Classification Search
CPC ..................... F16D 2011/002; F16D 11/00–16
See application file for complete search history.

(56) References Cited

U.S. PATENT DOCUMENTS 4,890,686 A * 1/1990 Hamada ................. B60K 23/08
701/69
10,352,372 B2 * 7/2019 Weidemann ............ F16D 11/14
(Continued)

FOREIGN PATENT DOCUMENTS

DE 578901 6/1933
DE 10126485 12/2002
(Continued)

OTHER PUBLICATIONS

Office Action for corresponding German Patent Application No. DE 10 2021 200 503.9.

*Primary Examiner* — Timothy Hannon
(74) *Attorney, Agent, or Firm* — Cozen O'Connor

(57) ABSTRACT

A dog clutch arrangement for a motor vehicle having a clutch body. The clutch body has first teeth in a first toothing and an axially movable sliding sleeve arrangement with second teeth in a second toothing. The sliding sleeve arrangement has a shift ring and a sleeve with the second toothing, and the shift ring and the sleeve are decoupled over a predetermined path by a decoupling element

15 Claims, 5 Drawing Sheets

(52) U.S. Cl.
CPC .......... *F16D 11/10* (2013.01); *F16D 2300/18* (2013.01); *F16D 2500/10462* (2013.01)

(56) References Cited

U.S. PATENT DOCUMENTS

| | | | |
|---|---|---|---|
| 11,739,798 B2* | 8/2023 | Ruider | F16D 11/14 |
| | | | 192/69.9 |
| 2012/0316023 A1* | 12/2012 | Bausch | F16H 57/02004 |
| | | | 475/150 |
| 2019/0001951 A1* | 1/2019 | Kohlböck | B60W 10/108 |
| 2019/0128417 A1* | 5/2019 | Schulte | F16D 11/14 |
| 2019/0264753 A1* | 8/2019 | Creech | F16D 11/10 |
| 2020/0096054 A1* | 3/2020 | Smith | B60K 17/34 |

FOREIGN PATENT DOCUMENTS

| | | |
|---|---|---|
| DE | 102014015093 | 4/2016 |
| DE | 102018207628 | 11/2019 |
| DE | 102018212915 | 2/2020 |
| DE | 102019203255 | 9/2020 |
| WO | WO 2017075180 | 5/2017 |

* cited by examiner

DOG CLUTCH ASSEMBLY, POWERTRAIN, AND MOTOR VEHICLE

CROSS REFERENCE TO RELATED APPLICATIONS

This is a U.S. national stage of Application No. PCT/EP2022/051000 filed Jan. 18, 2022. Priority is claimed on German Application No. DE 10 2021 200 503.9 filed Jan. 21, 2021, the content of which is incorporated herein by reference.

BACKGROUND OF THE INVENTION

1, Field of the Invention

The disclosure is directed to a dog clutch arrangement for a motor vehicle having a clutch body that has first teeth in a first toothing and an axially movable sliding sleeve arrangement with second teeth in a second toothing.

2. Description of the Related Art

Dog clutches are positive engagement clutches in which two toothings are brought into engagement so that torque can be transmitted.

In hybrid vehicles and electric vehicles, an axle or the axle that is electrically driven, respectively, or the electric motor, which is an on-demand type drive, needs to be decoupled from the rest of the drivetrain. In this way, the drag torque of the electric motor can be prevented from occurring as power loss. In this regard, there is a particular need to close the dog clutch during driving to allow the electric motor to be coupled in during ongoing operation.

It can happen when dog clutches are engaged that the teeth of the two clutch elements come to rest on one another and do not mesh at first. This position is called a tooth-on-tooth position. In order to allow engagement via an actuator in spite of such a tooth-on-tooth position, it is known to support the element, which is actually axially stationary, in this case, the clutch 5 body, with a spring. Accordingly, the sliding sleeve that is engaged can be continuously moved in a tooth-on-tooth position during engagement so that the control of the actuator is facilitated. A sensor is provided on the clutch body side in order to detect this position.

SUMAMRY OF THE INVENTION

In view of the foregoing, it is an object of one aspect of the present invention to provide a dog clutch arrangement with a simpler construction.

According to one aspect of the invention, the sliding sleeve arrangement has a shift ring on the input side and a sleeve with the second toothing on the output side, the shift ring and the sleeve being decoupled over a predetermined path by a decoupling element. In other words, the shift ring and/or the sleeve can be moved for a certain distance, namely, the predetermined path, without the other part having to move along with it. On the other hand, they are not completely decoupled because, otherwise, they could not be engaged jointly. But they can be decoupled for a predetermined distance.

The shift ring and the sleeve are preferably decoupled for a predetermined distance exclusively in engagement direction. For example, the shift ring and the sleeve can be coupled continuously in disengagement direction or continuously starting from a certain position.

Further, one aspect of the invention is considered to be that the decoupling element, particularly a spring element, is arranged at the sliding sleeve arrangement. Accordingly, an additional sensor arrangement on the clutch body side can be omitted. In particular, the actuation process can also be carried out in a simplified manner with the described arrangement.

Accordingly, the dog clutch comprises two parts. The first part is called the clutch body and is substantially stationary. By "stationary" is meant herein that it is movable to such a slight extent that its axial movability cannot unintentionally engage the dog clutch. The clutch body is preferably arranged in such a way that it is free from play.

The dog clutch arrangement has a sliding sleeve arrangement as axially movable part for engagement. This sliding sleeve arrangement is formed of two parts, and the two parts are coupled with one another via a spring element. The sleeve has the toothing, while a shift ring is provided on the shift fork side. This shift ring is preferably annular but can also have different shapes. In terms of function, it merely transfers the force coming from an actuator to the spring element, which connects the shift ring to the sleeve.

The spring element can preferably have a travel distance that is smaller than the overlap of the sleeve. The overlap is the maximum distance that the meshing teeth lie one above the other in axial direction. Accordingly, the travel distance is sufficiently large for the teeth to mesh after a tooth-on-tooth position has been overcome but not so large that the engagement position of the actuator is reached during a tooth-on-tooth position.

The sleeve can preferably have a stop that spans the spring arrangement in disengagement direction. The spring element is then functional exclusively in engagement direction.

The dog clutch arrangement can preferably have an actuator with an electric motor. This electric motor can have a position sensor. The position sensor can preferably be configured as a rotational angle sensor. The position of the shift ring can then also be determined via the rotational angle sensor and the geometric layout. As will be described in more detail below, the position of the sleeve can also be deduced taking into account boundary conditions in the described dog clutch arrangement. Therefore, a position sensor on the clutch body side can be omitted.

The actuator can preferably be formed electromechanically or electrohydraulically. Accordingly, it can also have a hydraulic portion for spanning longer distances.

Alternatively, a hydraulic actuator arrangement with a hydraulic control device can be used. Further alternatively, a magnetic actuation is possible.

The spring element can preferably be formed as a plate spring. Further, the dog clutch arrangement can have a shift fork. This shift fork advantageously engages in the shift ring and displaces it in axial direction.

Alternatively, the spring element is formed as a wave spring. A wave spring is preferred particularly with larger spring paths.

Broadly speaking, the spring element is preferably formed annularly. A uniform transmission of force to the sleeve can be achieved in this way.

The shift toothing of the clutch body and sliding sleeve can extend in axial or radial direction. Further, the movable sliding sleeve has an axial or radial sliding toothing in addition.

The first teeth and/or the second teeth can advantageously extend in radial direction. As concerns the toothing, only the toothings of the clutch body and the sleeve have been mentioned so far. However, the sleeve can also be connected to a driveshaft via a toothing. The toothings can preferably be formed as fitting toothings. Alternatively, the toothings can be formed as face toothings. Further, a fitting toothing and a face toothing can also be used. In particular, a fitting toothing can be provided between the driveshaft and the sleeve, and the face toothing can be provided between the sleeve and the clutch body.

In addition, one aspect of the invention is directed to a powertrain for a motor vehicle with a first axle and a second axle. At least one wheel is arranged at each axle on each side, and a differential gear is arranged on at least one of the axles. The powertrain is characterized in that a dog clutch arrangement, which is formed as described above is arranged between the differential gear and one of the wheels.

In addition, one aspect of the invention is directed to a powertrain for a motor vehicle with a first axle and a second axle, and at least one wheel is arranged at each axle on each side, and the two axles are connected via a propeller shaft. The powertrain is characterized in that a dog clutch arrangement as described above is arranged at the propeller shaft.

In addition, one aspect of the invention is directed to a powertrain for a motor vehicle with a first axle and a second axle, at least one wheel being arranged at each axle on each side. A gear ratio step is located between the rotor and the differential. A shaft, also called intermediate shaft, is part of this gear ratio step. It advantageously carries at least two spur gears. The powertrain is characterized in that a dog clutch arrangement as described above is arranged at the intermediate shaft.

At least one electric motor, particularly a traction electric motor, is associated with each described powertrain. This electric motor can be decoupled from the rest of the powertrain with the dog clutch arrangement. The traction electric motor is referred to as such to distinguish it from other electric motors of the powertrain, such as the electric motor of the actuator of the dog clutch arrangement, for example. Of course, it has multiples of power output because it must drive the motor vehicle.

In addition, one aspect of the invention is directed to a powertrain for a motor vehicle with a first axle and a second axle. At least one wheel is arranged at each axle on each side, and a differential gear is arranged on at least one of the axles. The powertrain is characterized in that a dog clutch arrangement as described above is arranged in the differential gear.

One aspect of the invention is further directed to a motor vehicle with a dog clutch arrangement and/or a powertrain. The motor vehicle is characterized in that the dog clutch arrangement and/or the powertrain are/is formed as described.

BRIEF DESCRIPTION OF THE DRAWINGS

Further features, advantages and particulars of the invention will become apparent from the following description of exemplary embodiments and figures. The drawings show.

DETAILED DESCRIPTION OF THE PRESENTLY PREFERRED EMBODIMENTS

Figure 1:
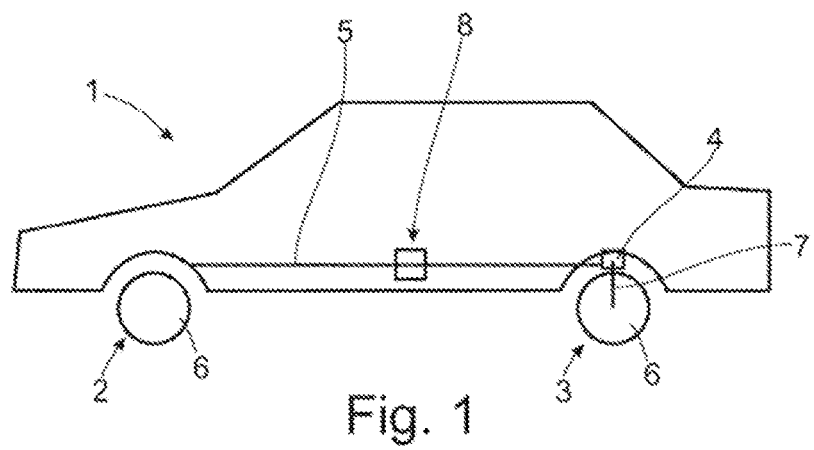
FIG. 1 is a motor vehicle.

FIG. 1 shows a motor vehicle 1 with two axles 2 and 3. A differential 4 is arranged at at least one of the axles. The axles can be connected via an intermediate shaft 5. Side shafts 7, as they are called, are located between the differential and the wheels 6 of the axles. FIG. 1 further shows a dog clutch arrangement 8. This dog clutch arrangement 8 is shown at the propeller shaft purely by way of example. But it can just as easily be arranged at the side shaft 7 or in the differential 4.

Figure 2:
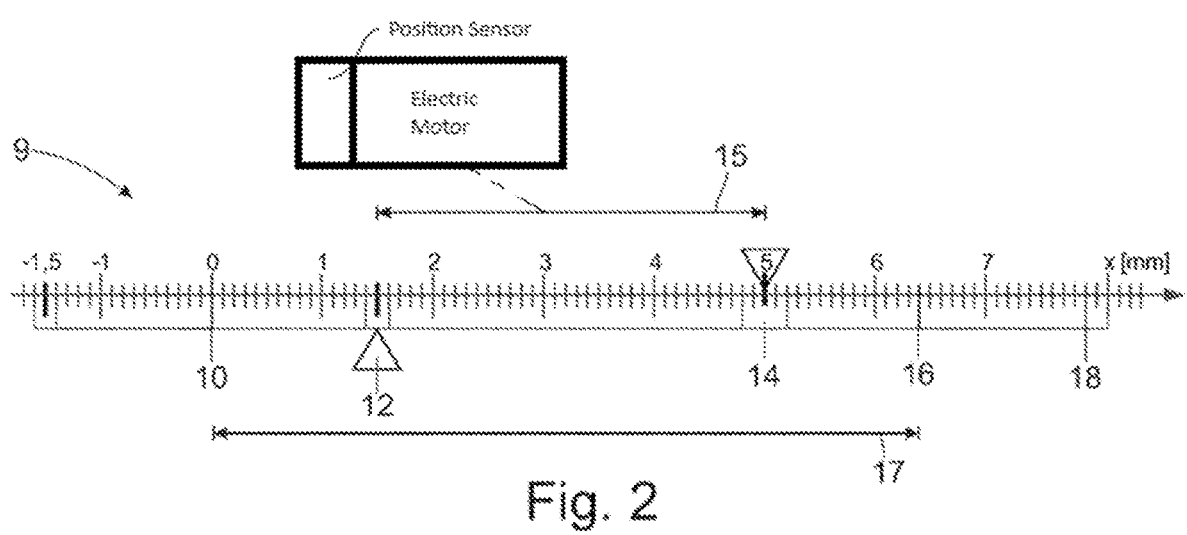
FIG. 2 is a path profile of an actuation process of a dog clutch.

FIG. 2 shows the distance 9 of an actuation path. It is indicated in millimeters, but the indicated path lengths are basically arbitrary. The sequence of key points stated in the following is not limited to the indicated path lengths but, on the contrary, they can be adapted in individual cases.

The sliding sleeve of the dog clutch arrangement 8 is in the disengaged state at position 10. This can also be referred to as the disengagement position. If the sleeve is then displaced in engagement direction, it reaches the tooth-on-tooth position 12 after a certain distance. Since the electric motor of the dog clutch arrangement 8 has a rotational angle sensor, it is known when this position is reached. Due to the fact that a spring element is arranged between the shift ring and the sleeve, as will be shown later, its travel distance 15 can easily be covered up to the block position 14. When the tooth-on-tooth position is overcome, the sleeve can also be moved farther in direction of the clutch body until it reaches the end position 16. The overlapping of the shift toothing is complete by the end position 16. The limiting of travel is effected either in the tooth base of the shift toothing or at a selected stop in the clutch body. The powertrain torque can be transmitted in its entirety at the end position 16.

The travel distance 15 is smaller than the engagement path 17. The engagement path 17 is the path traveled by the sleeve or the shift ring from position 10 to positon 16 during engagement.

Figure 3:
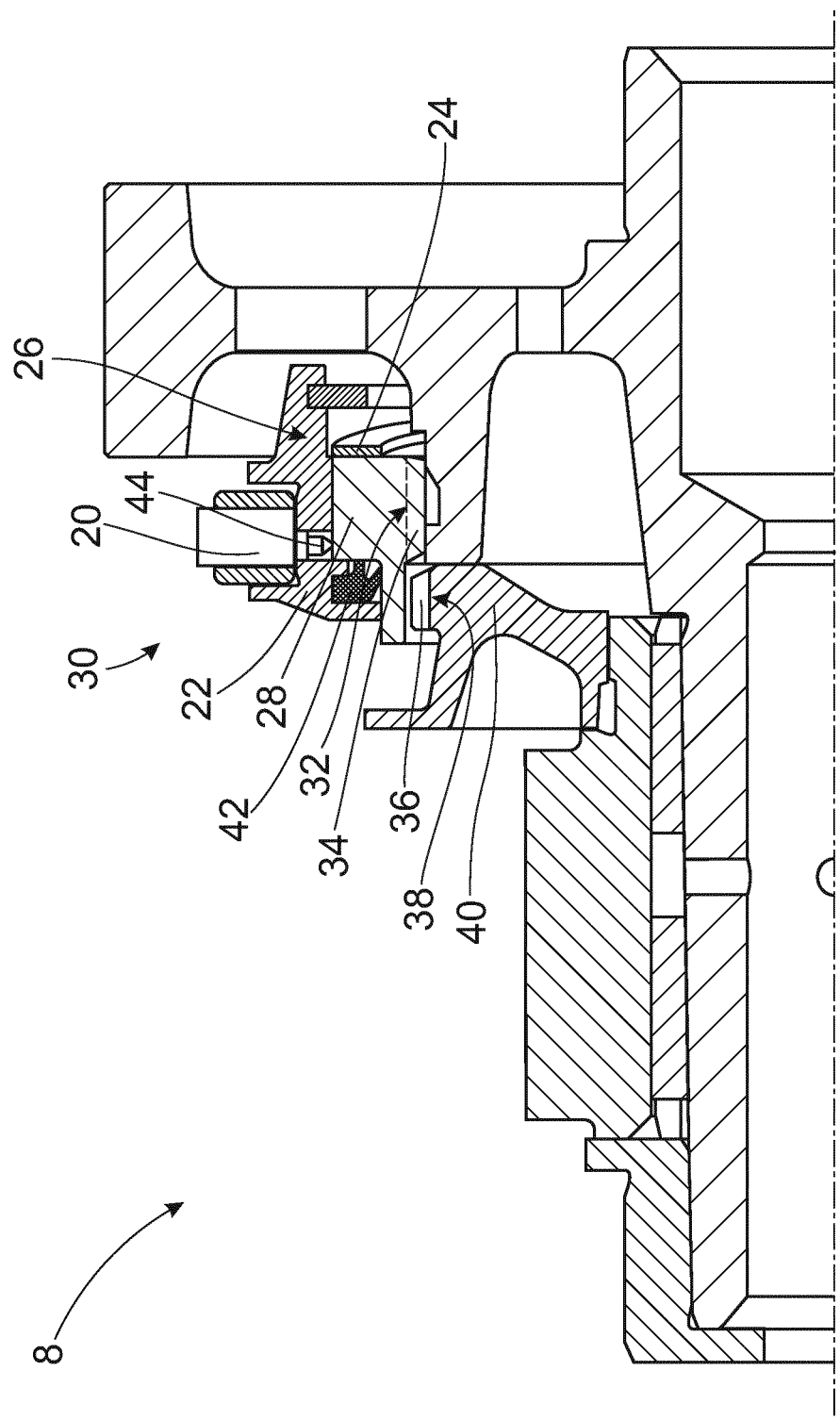
FIG. 3 is a dog clutch arrangement in a first position.

FIG. 3 shows the dog clutch arrangement 8 in a first position, namely, the disengagement position. A portion of a shift fork 20 that engages in a shift ring 22 is shown. This shift ring 22 is connected to the sleeve 28 via a plate spring 24 as spring element 26. The shift ring 22, the plate spring 24 and the sleeve 28 together form the sliding sleeve arrangement 30.

Second teeth 34 are located at the sleeve 28 as second toothing 32.

These second teeth 34 are to be brought into engagement with first teeth 36 of the first toothing 38 of the clutch body 40.

The clutch body is axially stationary; that is, its axial movability is not sufficient to engage the dog clutch arrangement 8.

In FIG. 3, the dog clutch arrangement 8 is in the disengagement position 10.

Further, a seal 42 is arranged between the shift ring 22 and the sleeve 28. This seal 42 can be used in combination with the orifice 44 to damp the movement of the sliding sleeve arrangement 30.

Figure 4:
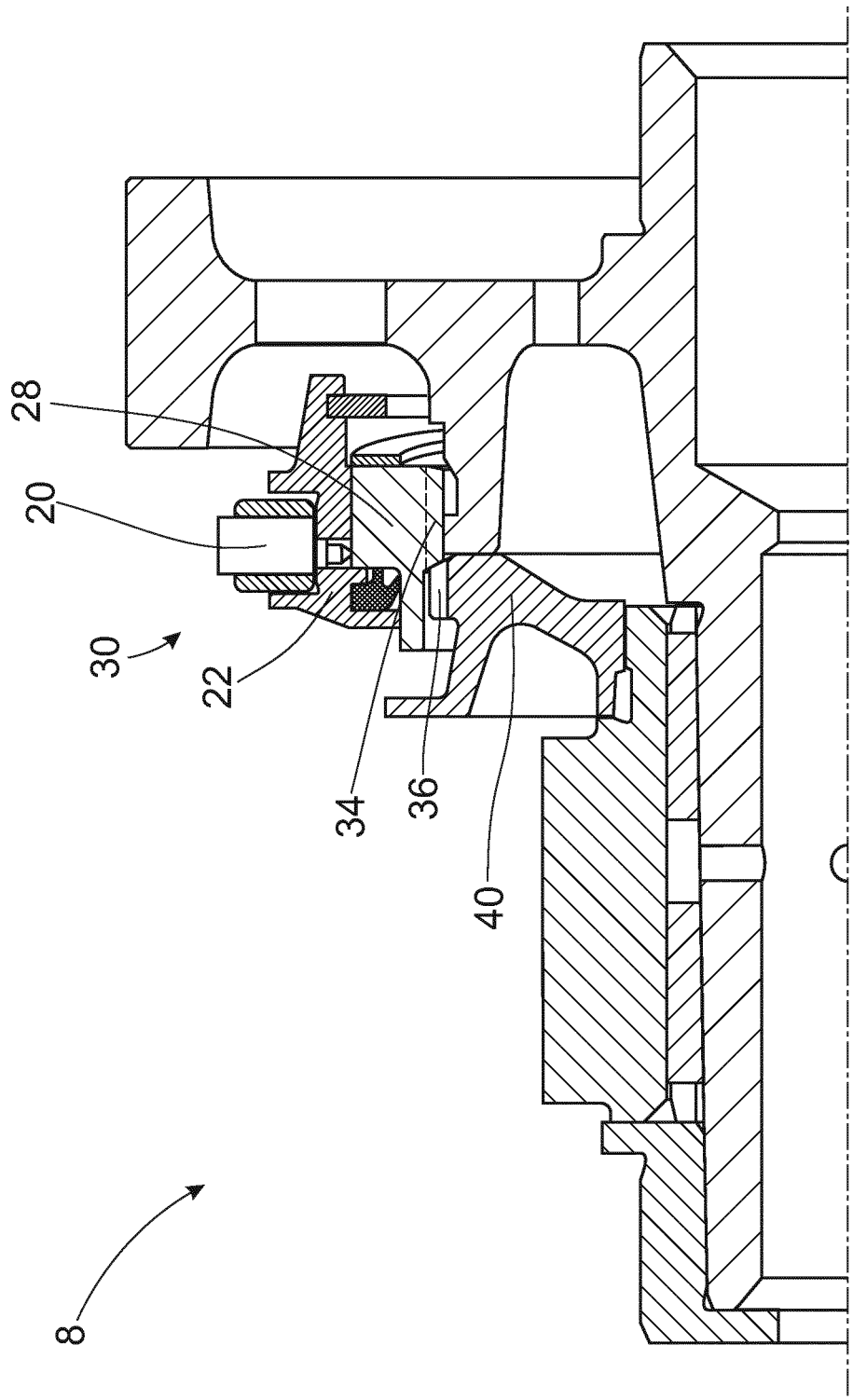
FIG. 4 is a dog clutch arrangement in a second position.

FIG. 4 shows the dog clutch arrangement 8 in the tooth-on-tooth position 12. The first teeth 36 and the second teeth 34 can be on top of one another. In this position, the tooth surfaces need not be directly on top of one another in their entirety; on the contrary, it is sufficient when a small portion overlaps. The teeth can then not move into the corresponding gaps. In spite of this, the actuator can move farther, since the spring element 26 initially follows the shift ring 22. If a tooth-on-tooth position exists, it can be ignored for the time being because the spring element 26 can then simply be preloaded. The tooth-on-tooth position between the first teeth 36 and the second teeth 34 is eventually canceled at least as long as there is a determined difference in speed. The toothings can then mesh with one another, which happens in an accelerated manner particularly when a spring element 26 is preloaded. After the tooth-on-tooth position 12, however, the shift ring 22 is preferably moved at a predetermined maximum velocity. This velocity is calculated in such a way that the tooth-on-tooth position is canceled before the travel of the spring element 26 is exhausted. Of course, the difference in speed between the sleeve 28 and the clutch body 40 must be taken into account. The greater the difference, the faster the tooth-on-tooth position is overcome. For safety reasons, an upper threshold which may be referred to as a rejection limit speed, for example, can be provided. A clutch engagement process is not possible above this rejection limit speed.

Figure 5:
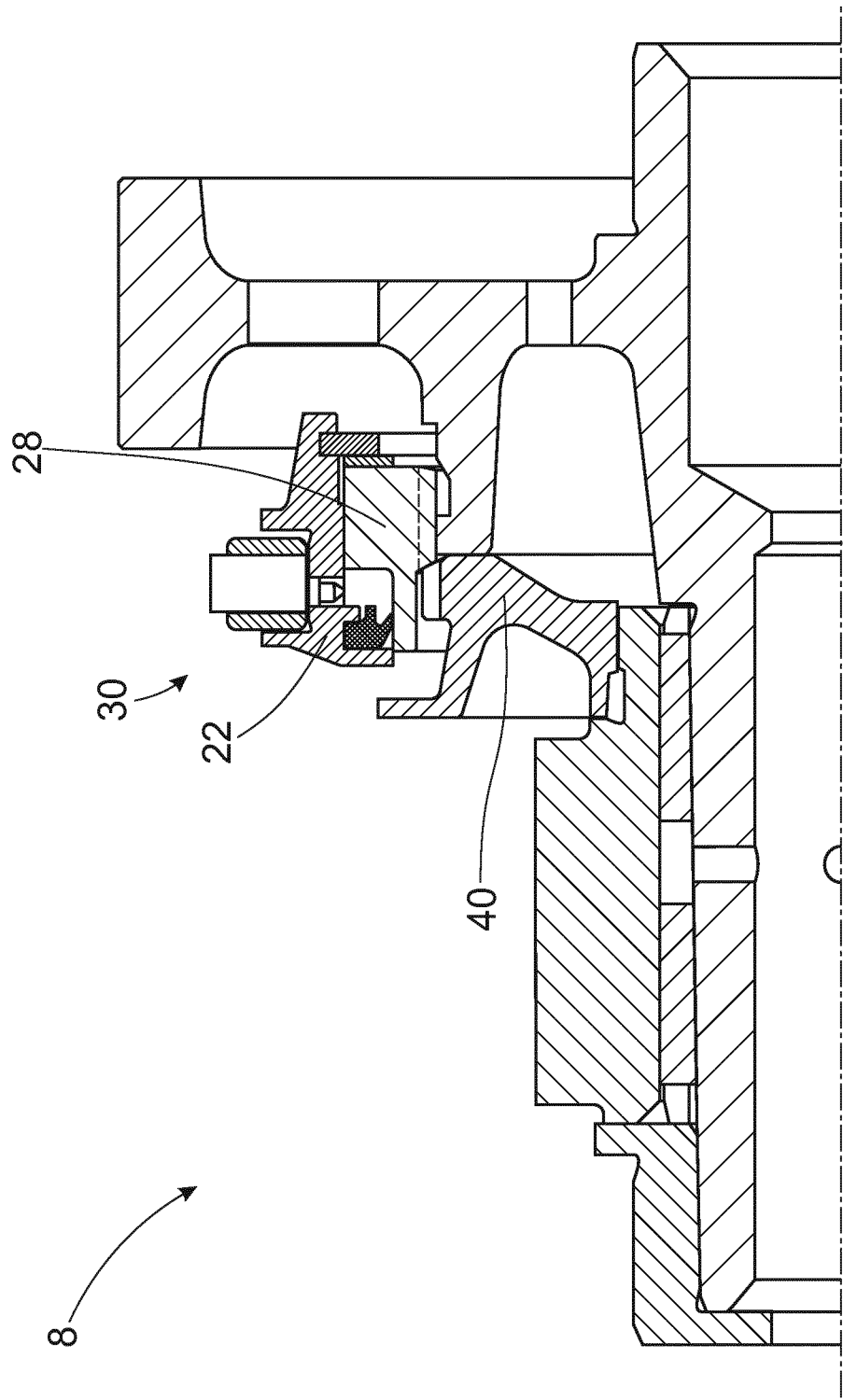
FIG. 5 is a dog clutch arrangement in a third position.

FIG. 5 shows the dog clutch arrangement 8 in the block position 14. It can be determined by an additional measurement of force or a limiting of the force at the electric motor of the actuator of the clutch arrangement whether or not a blocking occurs. Blocking, in and of itself, is prevented at sufficiently large differences in speed. However, particularly when a motor vehicle is stationary, for example, at a red light, it can happen that the tooth-on-tooth position is not overcome until the block position 14 is reached. But this does not automatically mean that the spring element 26 has gone solid. However, if the difference in speed falls below a given threshold, it can be checked in this position whether the torque put out by the electric motor is greater than another threshold value or whether the force-limited actuator comes to a standstill. If this is the case, a momentary fully compressed position of the spring element can be assumed. The actuator current is then reduced so as to prevent damage to the dog clutch arrangement.

Otherwise, this fully compressed position of the spring element 26 is already overcome in that it is possible for the teeth to mesh as the difference in speed between the sleeve 28 and the clutch body 40 increases.

Figure 6:
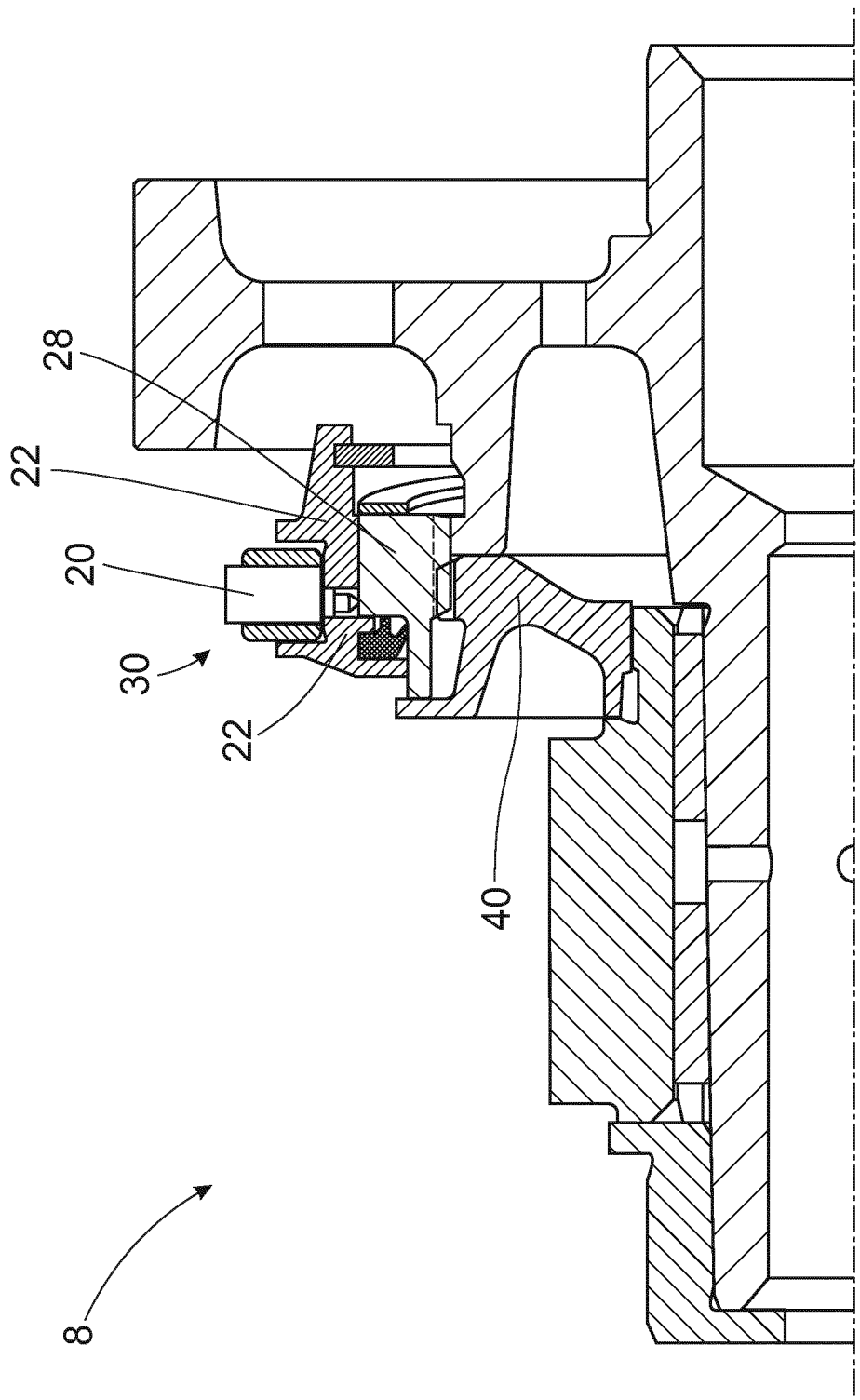
FIG. 6 is a dog clutch arrangement in a fourth position.

FIG. 6 shows the dog clutch arrangement 8 in the end position 16. The toothings are brought into engagement, in other words, mesh with one another, and overlap over a length such that the full torque of the electric motor of the powertrain can be transmitted.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A dog clutch arrangement for a motor vehicle comprising:
   a clutch body having first teeth in a first toothing; and
   an axially movable sliding sleeve arrangement with second teeth in a second toothing,
   wherein the sliding sleeve arrangement comprises:
      a shift ring and a sleeve with the second toothing; and
      a decoupling element configured to decouple the shift ring and the sleeve over a predetermined path and act on a longitudinal end of the sleeve opposite the clutch body and a portion of the shift ring opposite the clutch body.

2. The dog clutch arrangement according to claim 1, wherein the decoupling element includes a spring element and has a travel distance.

3. The dog clutch arrangement according to claim 2, wherein the travel distance is shorter than an engagement path of the sleeve.

4. The dog clutch arrangement according to claim 2, wherein the sleeve has a stop.

5. The dog clutch arrangement according to claim 2, wherein the spring element is a plate spring.

6. The dog clutch arrangement according to claim 1, further comprising:
   an actuator with an electric motor.

7. The dog clutch arrangement according to claim 6, wherein the electric motor has a position sensor.

8. The dog clutch arrangement according to claim 7, wherein the position sensor is a rotational angle sensor.

9. The dog clutch arrangement according to claim 1, wherein the dog clutch arrangement is formed without sensors on a clutch body side.

10. The dog clutch arrangement according to claim 1, wherein the decoupling element is arranged between the longitudinal end of the sleeve and the shift ring.

11. A powertrain for a motor vehicle comprising:
   a first axle;
   a second axle,
   at least one wheel is arranged at each axle on each side;
   a differential gear arranged on at least one of the axles; and
   a side shaft with a dog clutch arrangement is arranged between the differential gear and one of the wheels,
   wherein the dog clutch arrangement comprises:
      a clutch body having first teeth in a first toothing; and
      an axially movable sliding sleeve arrangement with second teeth in a second toothing,
      wherein the sliding sleeve arrangement comprises:
         a shift ring and a sleeve with the second toothing; and
         a decoupling element configured to decouple the shift ring and the sleeve over a predetermined path and act on a longitudinal end of the sleeve opposite the clutch body and a portion of the shift ring opposite the clutch body.

12. A powertrain for a motor vehicle comprising:
   a first axle and a second axle;
   at least one wheel is arranged at each axle on each side;
   a propeller shaft configured to connect the two axles; and
   a dog clutch arrangement arranged at the propeller shaft that comprises:
      a clutch body having first teeth in a first toothing; and
      an axially movable sliding sleeve arrangement with second teeth in a second toothing,
      wherein the sliding sleeve arrangement comprises:
         a shift ring and a sleeve with the second toothing; and
         a decoupling element configured to decouple the shift ring and the sleeve over a predetermined path and act on a longitudinal end of the sleeve opposite the clutch body and a portion of the shift ring opposite the clutch body.

13. A powertrain for a motor vehicle comprising:
a first axle and a second axle;
at least one wheel is arranged at each axle on each side; and
a differential gear arranged at least one of the axles; and
a dog clutch arrangement arranged in the differential that comprises:
 a clutch body having first teeth in a first toothing; and
 an axially movable sliding sleeve arrangement with second teeth in a second toothing,
wherein the sliding sleeve arrangement comprises:
 a shift ring and a sleeve with the second toothing; and
 a decoupling element configured to decouple the shift ring and the sleeve over a predetermined path and act on a longitudinal end of the sleeve opposite the clutch body and a portion of the shift ring opposite the clutch body.

14. A powertrain for a motor vehicle comprising:
a first axle and a second axle;
at least one wheel is arranged at each axle on each side;
a traction electric motor is associated with at least one axle;
a differential gear is arranged at the at least one axle;
a gear ratio step is located between a rotor of the traction electric motor and the differential gear;
an intermediate shaft is part of this gear ratio step; and
a dog clutch arrangement arranged at the intermediate shaft that comprises:
 a clutch body having first teeth in a first toothing; and
 an axially movable sliding sleeve arrangement with second teeth in a second toothing,
wherein the sliding sleeve arrangement comprises:
 a shift ring and a sleeve with the second toothing; and
 a decoupling element configured to decouple the shift ring and the sleeve over a predetermined path and act on a longitudinal end of the sleeve opposite the clutch body and a portion of the shift ring opposite the clutch body.

15. A motor vehicle comprising:
a dog clutch that comprises:
a clutch body, which comprises: first teeth in a first toothing; and
an axially movable sliding sleeve arrangement with second teeth in a second toothing,
wherein the sliding sleeve arrangement comprises:
 a shift ring and a sleeve with the second toothing; and
 a decoupling element configured to decouple the shift ring and the sleeve over a predetermined path and act on a longitudinal end of the sleeve opposite the clutch body and a portion of the shift ring opposite the clutch body.

* * * * *